United States Patent
Strong et al.

(10) Patent No.: US 6,616,567 B2
(45) Date of Patent: Sep. 9, 2003

(54) TWO SPEED GEAR BOX

(75) Inventors: Victor R. Strong, Tulsa, OK (US); Dusan Jan Hvolka, Salt Lake City, UT (US)

(73) Assignee: Terex Corporation, Westport, CT (US)

( * ) Notice: Subject to any disclaimer, the term of this patent is extended or adjusted under 35 U.S.C. 154(b) by 0 days.

(21) Appl. No.: 09/974,107

(22) Filed: Oct. 10, 2001

(65) Prior Publication Data

US 2002/0119860 A1 Aug. 29, 2002

Related U.S. Application Data

(60) Provisional application No. 60/239,210, filed on Oct. 10, 2000.

(51) Int. Cl.[7] ............................................. F16H 57/08
(52) U.S. Cl. ........................................ 475/331; 475/322
(58) Field of Search ................................. 475/331, 296, 475/31, 23, 28, 320, 321, 322, 140, 142, 269; 192/221.1, 87.11, 87.14; 180/372, 371

(56) References Cited

U.S. PATENT DOCUMENTS

| 3,686,978 A | * | 8/1972 | Knoblach et al. ............ 475/296 |
| 3,717,049 A | * | 2/1973 | Brandt ......................... 475/141 |
| 4,186,626 A | * | 2/1980 | Chamberlain ............... 475/337 |
| 4,380,274 A | * | 4/1983 | Abraham et al. ........... 180/308 |
| 4,540,073 A | | 9/1985 | Rogier .......................... 192/4 |
| 4,998,052 A | | 3/1991 | Erdman ....................... 318/701 |
| 5,024,636 A | | 6/1991 | Phebus et al. .............. 475/141 |
| 5,328,419 A | | 7/1994 | Motl et al. ................... 475/324 |
| 5,478,290 A | | 12/1995 | Buuck et al. ................ 475/140 |
| 5,489,013 A | * | 2/1996 | Buuck et al. ............. 192/18 A |
| 5,588,931 A | | 12/1996 | Forster ......................... 475/338 |
| 5,655,988 A | | 8/1997 | Schnell ....................... 475/341 |
| 5,813,938 A | | 9/1998 | Forster ......................... 475/331 |
| 5,842,947 A | | 12/1998 | Weilant ....................... 475/323 |
| 5,848,664 A | | 12/1998 | Kaspar ......................... 180/308 |
| 6,007,447 A | | 12/1999 | Lin .............................. 475/149 |
| 6,063,001 A | * | 5/2000 | Suhling et al. ............. 475/331 |
| 6,080,077 A | | 6/2000 | Kamlukin .................... 475/339 |
| 6,090,006 A | | 7/2000 | Kingston ..................... 475/323 |
| 6,135,259 A | | 10/2000 | Forster ....................... 192/221.1 |
| 6,217,475 B1 | * | 4/2001 | Shih ............................. 475/269 |
| 6,290,048 B1 | | 9/2001 | Kohlmeier ................ 192/221.1 |
| 6,354,977 B1 | * | 3/2002 | Brown et al. ............... 475/204 |

FOREIGN PATENT DOCUMENTS

| DE | 198 05 679.6 | 8/1999 | |
| FR | 1 360 296 | 3/1964 | |
| GB | 1 352 207 | 5/1974 | |
| GB | 1 389 740 | * 4/1975 | ........... B60K/17/06 |

* cited by examiner

Primary Examiner—Saul Rodriquez
Assistant Examiner—David D. Le
(74) Attorney, Agent, or Firm—Marshall, Gerstein & Borun

(57) ABSTRACT

A two speed gear box includes a wheel hub that is rotatably supported by a spindle. The two speed gear box further includes an inboard planetary gear assembly and an outboard planetary gear assembly that cooperate to provide four modes of operation for the wheel hub with respect to a drive axle. The four modes of operation include a neutral mode, a braking mode, a high speed mode and a low speed mode. Selective engagement and disengagement of a clutch in the inboard planetary gear assembly, and selective engagement and disengagement of a clutch in the outboard planetary gear assembly provide for selection of one of the modes of operation.

16 Claims, 3 Drawing Sheets

TWO SPEED GEAR BOX

CROSS-REFERENCE TO RELATED APPLICATIONS

This application claims the priority benefit of U.S. Provisional Application No. 60/239,210 filed Oct. 10, 2000, the entire disclosure of which is incorporated herein by reference.

FIELD OF THE INVENTION

The present invention relates generally to gear boxes, and more particularly, to a two speed gear box for driving a hub, such as a wheel hub assembly.

BACKGROUND

In automotive design, the placement of the engine and the transmission is highly constrained by the function of the vehicle and its weight distribution, the size of the vehicle, traction considerations, and the position of the drive axle(s). In the case of passenger vehicles, comfort and convenience for the passengers are important considerations. One particular design constraint for off road vehicles is the requirement for all-wheel drive. On heavy equipment applications, such as all-wheel drive earth moving vehicles, the placement of the engine, the transmission, and the drive system components are particularly critical design considerations.

For example, on earth moving vehicles, poor ground conditions typically cause poor traction between the tires and the ground. To increase useful traction, such vehicles are typically designed as all-wheel drive vehicles. However, one drawback to using all-wheel drive systems on earth moving vehicles is that conventional placement of the engine, the transmission and the drive axle may interfere with the operation of the vehicle. For example, a tractor scraper, which self loads soil material and hauls the soil material to an unloading area, often encounters poor traction conditions. In order to properly cut and load the soil, a tractor scraper must have adequate traction at low speed. Adequate traction is typically achieved by using an all-wheel drive system during the loading cycle. However, in order to be effective as a haulage vehicle, a tractor scraper should also have high speed on-road capabilities.

The arrangement of a tractor scraper, with the bowl for the soil payload disposed between the drive axles, does not easily permit placement of a mechanical drive line between the two drive axles so as to permit driving force to be transmitted to all of the drive axles from a single engine. As a result, all-wheel drive may often be achieved by provided two engines and two mechanical transmissions, each driving a corresponding one of the two drive axles.

As an alternative to a mechanical drive system, hydrostatic drive systems are often employed for vehicles such as tractor scrapers. Hydrostatic drive systems are ideal transmission mechanisms for tractor scrapers because such drive systems are capable of transmitting power from one power source to multiple locations. However, the torque and speed range of hydrostatic drive systems are limited compared to those of mechanical transmissions.

DESCRIPTION OF THE PREFERRED EMBODIMENTS

The following description of the disclosed embodiment is not intended to limit the scope of the invention to the precise form or forms detailed herein. Instead, the following description is intended to be illustrative of the principles of the invention so that others may follow its teachings.

Figure 1:
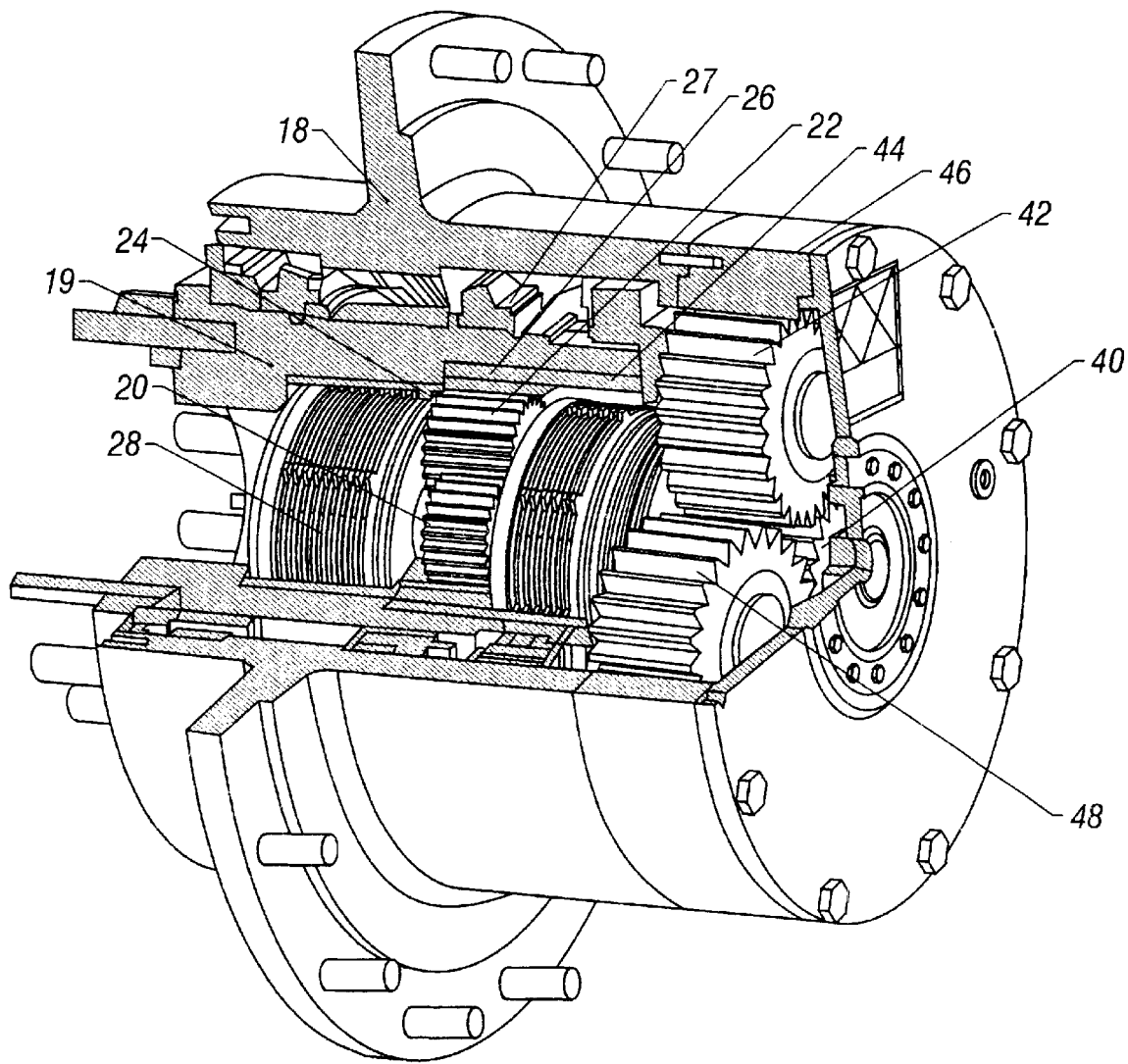
FIG. 1 is a fragmentary perspective view of the two speed gear box of the present invention.
Figure 2:
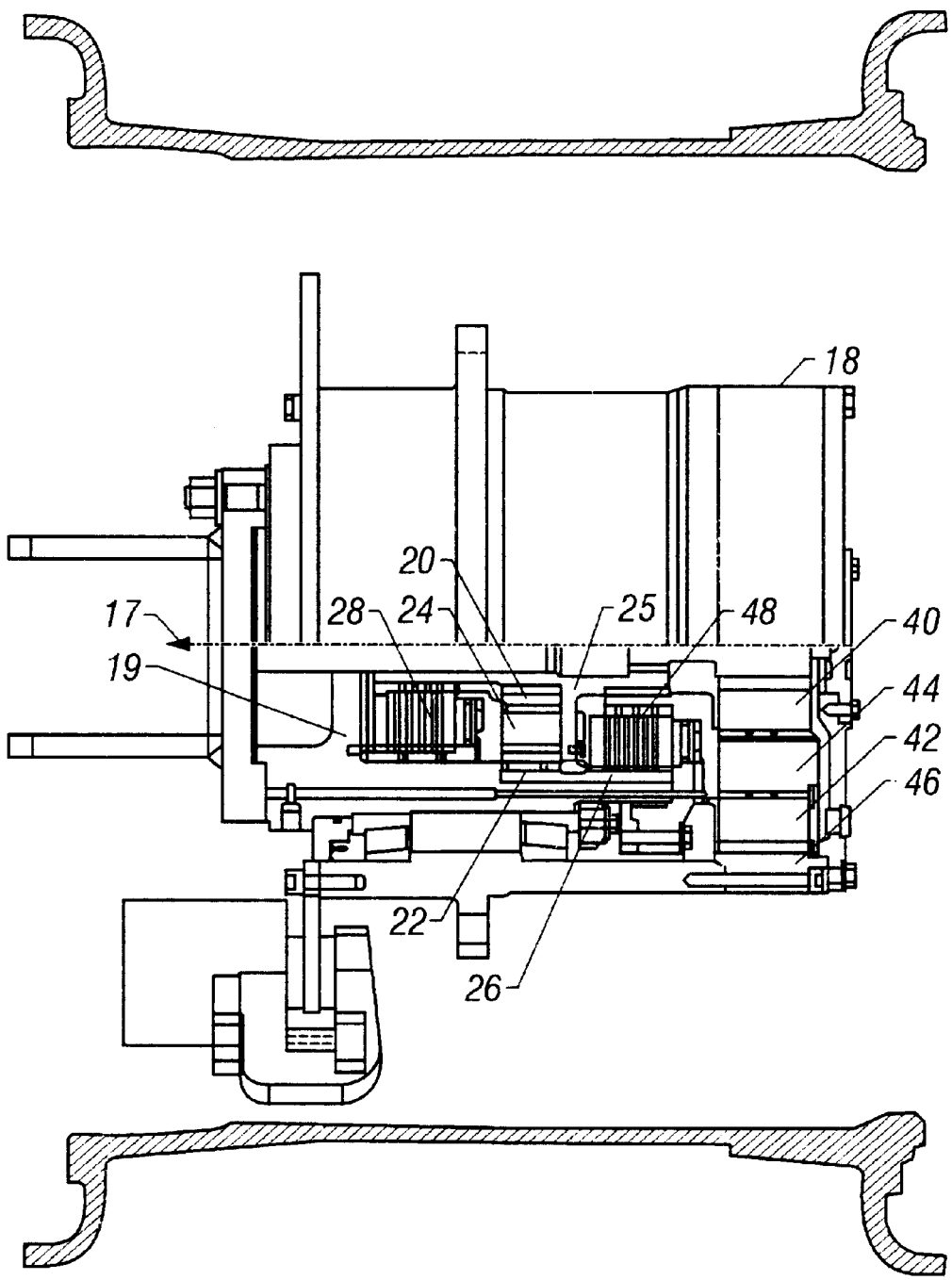
FIG. 2 is a fragmentary plan view of the two speed gear box of the present invention.
Figure 3:
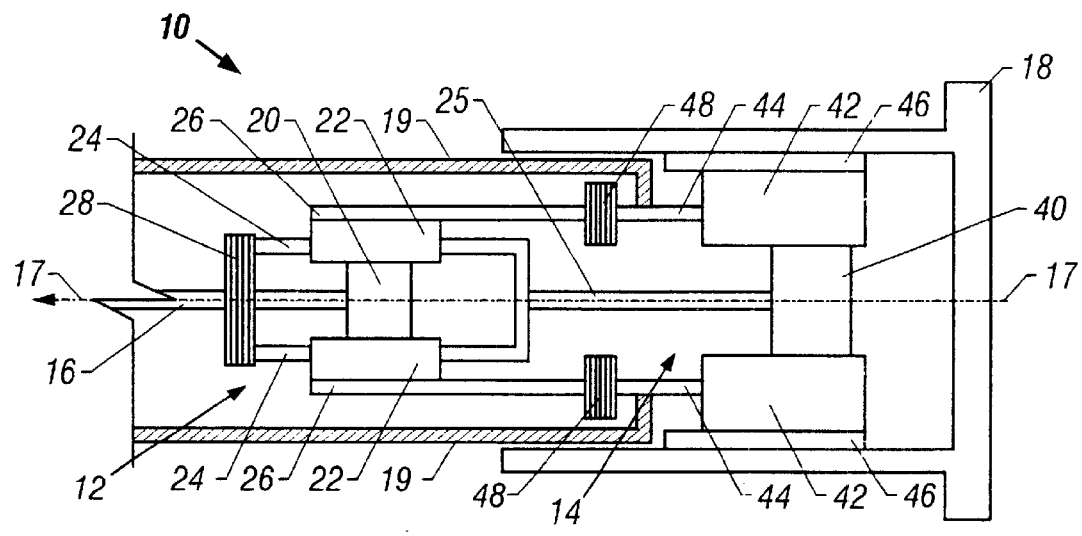
FIG. 3 is a schematic diagram of the two speed gear box of the present invention.

Referring now to FIGS. 1–3 of the drawings, a two speed gear box in accordance with the teachings of the present invention is generally referred to by the reference numeral 10. It will be understood that two speed gear box 10 is for use with any device that receives a torque input and provides a torque output. The two speed gear box 10 includes an inboard planetary gear assembly 12 and an outboard planetary gear assembly 14. As will be described in more detail below, the inboard planetary gear assembly 12 and the outboard planetary gear assembly 14 cooperate to receive a torque input from a drive axle 16 (shown in FIG. 3) that is rotatably aligned with the drive axis 17 (shown in FIG. 3), and to provide two geared outputs and two selectable operating modes for the wheel hub 18. The inboard planetary gear assembly 12 and part of the outboard planetary gear carrier 14 are housed in a spindle 19, which is attached to the support housing (not shown) of the drive axle 16 in a conventional manner.

The inboard planetary gear assembly 12 includes a sun gear 20, a number of planetary gears 22, a planetary gear carrier 24, a ring gear 26 and a clutch 28. The clutch 28 operatively connects the drive axle 16 to the planetary gear carrier 24 as will be explained in greater detail below. The planetary gear carrier 24 (which may take the form of a frame or other suitable structure as would be known) interconnects the planetary gears 22 such that the planetary gears 22 may orbit the sun gear 20 together about the pivot axis of the sun gear 20 (which is the same as the drive axis 17 in the disclosed example) as would be known. When the planetary gears 22 orbit the sun gear 20, each of the planetary gears 22 rotates about its own pivot axis as the planetary gear carrier 24 rotates about the axis of the sun gear 20 (which is the same axis as the drive axis 17). Thus, as each of the planetary gears 22 rotates about its own rotational axis, the planetary gears also translate about the axis of the sun gear 20, as would be known. In the disclosed example, the inboard planetary gear assembly 12 has two modes of operation as will be explained in greater detail below.

The outboard planetary gear assembly 14 includes a sun gear 40, a number of planetary gears 42, a planetary gear carrier 44, a ring gear 46 and a clutch 48. The clutch 48 operatively connects the ring gear 26 of the inboard planetary gear assembly 12 to the planetary gear carrier 44 as will be explained in greater detail below. Torque input to the planetary gear assembly is through the sun gear 40, which itself receives the torque input from the planetary gear carrier 24 of the inboard planetary gear assembly 12. The planetary gear carrier 44 is fixed to the spindle 19 and is not free to rotate.

The wheel hub 18 has a generally cylindrical inside surface, in which the ring gear 46 is fixedly mounted. Thus, unlike the inboard planetary gear assembly 12, the outboard planetary gear assembly 14 only has one mode of operation. The sun gear 40 rotates each of the planetary gears 42, which in turn causes rotation of the ring gear 46, thereby rotating the wheel hub 18. The clutch 48, when engaged, couples the outboard planetary gear carrier 44 to the ring gear 26 of the inboard planetary gear assembly 12. Thus, when the clutch 48 is engaged the ring gear 26 of the inboard planetary gear assembly 12 will not rotate. On the other hand, the ring gear 26 of the inboard planetary gear assembly 12 is free to rotate when the clutch 48 is disengaged.

The two speed gear box 10 operates as follows. The sun gear 20 receives torque input from the drive axle 16 (unaffected by the clutch 28). The ring gear 26 is rotatably mounted within the spindle 19 and supported on bearings 27 in a conventional manner. By virtue of the clutch 28, rotation of the drive axle 16 may be transmitted to the ring gear 26 as follows. When the clutch 28 is disengaged and the clutch 48 is engaged, rotation of the sun gear 20 via torque input from the drive axle 16 causes the planetary gears 22 to orbit about the sun gear 20. By virtue of the gear carrier 24, this orbital motion causes rotation of the sun gear 40 by virtue of the connecting shaft 25. The clutch 48 holds the ring gear 26 in a fixed position. Rotation of the sun gear 40 in turn rotates the planetary gears 42.

Because the planetary gear carrier 44 is fixed to the spindle 19, the planetary gears 42 rotate about their respective axes but do not orbit about the sun gear 40. The rotation of the planetary gears 42 is transmitted to the hub 18 via the ring gear 48. In this mode of operation, there is a relatively high degree of gear reduction, which drives the hub 18 at a relatively low speed with relatively high driving torque.

In another mode of operation, the inboard clutch 28 is engaged, and the outboard clutch 48 is disengaged. Rotation of the sun gear 20 via the drive axle 16 is transmitted directly to the ring gear 26, which is free to rotate on the bearings 27 about the drive axis 17 (because the clutch 48 is disengaged). The clutch 28 couples the planetary gear carrier 24 to the sun gear 20 when the clutch 28 is engaged. Thus, as the sun gear 20 rotates, the planetary gears 22 translate about the drive axis 17 in conjunction with the rotation of the sun gear 20. However, the planetary gears 22 do not rotate about their respective axes. By virtue of the ring gear 26 attached to the planetary gears 22, the translation of the planetary gears 22 is transmitted to the sun gear 40 via the shaft 25. In turn, rotation of the sun gear 40 rotates the planetary gears 42, thus rotating the hub 18. In this mode of operation, there is a relatively low gear reduction, resulting in a relatively higher speed and lower torque transmission to the hub 18.

Thus, selectively engaging and disengaging the clutch 28 and the clutch 48 provides two gear ratios and two modes of operation for the wheel hub 18 relative to the drive axle 16. The two gear ratios are a high speed gear ratio and a low speed gear ratio. In addition, it will be understood that other modes of operation are achievable by selectively engaging and disengaging the clutches 28 and 48. For example, if both clutches 28 and 48 are engaged, a brake mode is effectively provided. This is because forces transmitted to the ring gear 26 via the engaged clutch 28 are resisted due to the fact that the ring gear, being locked to the non-rotatable planetary gear carrier 44 by the clutch 48, effectively cannot rotate.

On the other hand, if both clutches are disengaged, no torque will be transmitted through the gear box 10, thus providing a neutral mode. The wheel hub 18 is freely rotatable with respect to the drive axle 16 when the gear box 10 is in the neutral mode.

By way of further explanation, and referring to FIG. 3, engagement of the clutch 28 and disengagement of the clutch 48 activate the high speed gear ratio. Engagement of clutch 28 locks the planetary gear carrier 24 to the sun gear 20 and disengagement of the clutch 48 allows the ring gear 26 to rotate freely. Because the clutch 28 locks the planetary gear carrier 24 to the sun gear 20, the sun gear 20 and the planetary gear carrier 24 rotate with the speed of the sun gear 20. As a result, the inboard planetary gear assembly 12 provides the sun gear 40 with a direct coupling to the drive axle 16. The sun gear 40 then rotates the planetary gears 42, which in turn rotate the ring gear 46, thereby rotating the wheel hub 18. Based on planetary gear equations, which are well known in the art, the speed reduction and torque increase ratio through the two speed gear box 10 is:

$$\frac{NR_2}{NS_2}$$

Where:

$NR_2$ is the number of gear teeth on the ring gear 46

$NS_2$ is the number of gear teeth on the sun gear 40.

Engagement of the clutch 48 and disengagement of the clutch 28 activate the low speed gear ratio. Engagement of clutch 48 locks the ring gear 26 to the planetary gear carrier 44, thereby preventing the ring gear 26 from rotation. Disengagement of the clutch 28 allows the planetary gear carrier 24 to freely rotate around the sun gear 20, thereby providing for the planetary gears 22 to orbit the sun gear 20. With the low speed gear ratio, the inboard planetary gear assembly 12 provides a speed reduction or torque increase of:

$$\left(\frac{NR_1}{NS_1}\right) + 1$$

Where:

$NR_1$ is the number of gear teeth on the ring gear 26 $NS_1$ is the number of gear teeth on the sun gear 20.

The planetary gear carrier 24 is directly coupled to the sun gear 40. The sun gear 40 rotates the planetary gears 42, which in turn rotate the ring gear 46, thereby rotating the wheel hub 18. Therefore, combining the speed reduction or torque increase in the inboard planetary gear assembly 12 with speed reduction or torque increase in the outboard planetary gear assembly 14, the total speed reduction and torque increase ratio through the two speed gear box 10 is:

$$\left(\frac{NR_1}{NS_1}+1\right)\left(\frac{NR_2}{NS_2}\right)$$

Engagement of the clutch 28 and engagement of the clutch 48 lock the wheel hub 18 relative to the drive axle 16, thereby providing a brake mode. Engagement of the clutch 48 couples the ring gear 26 to the planetary gear carrier 44, which is fixed to the spindle 19. In effect, the ring gear 26 will be indirectly fixed to the spindle 19. Engaging the clutch 28 couples the planetary gear carrier 24 to the sun gear 20. With the ring gear 26 being prevented from rotation and the planetary gear carrier 24 being coupled to the sun gear 20, the inboard planetary gear assembly 12 becomes effectively locked, thereby locking the outboard planetary gear assembly 14. In other words, the axle 16 and the wheel hub 18 become indirectly fixed to the spindle 19.

Disengagement of the clutch 28 and disengagement of the clutch 48 provide for free rotation of the wheel hub 18 relative to the drive axle 16. With the clutch 48 disengaged, the ring gear 26 is free to rotate, and with the clutch 28 disengaged, the torque input from the sun gear 20 is coupled to the ring gear 26 causing its rotation. The free rotation of the ring gear 26 causes the planetary gear carrier 24 to remain stationary so that the rotation of the sun gear 20 is transferred through the planetary gears 22 to the ring gear 26. Thus, no torque is transmitted to the outboard planetary gear assembly 14, thereby providing for a freewheel mode for the wheel hub 18.

The possible reduction ratios for the two speed gear box 10 range from 2:1 to 11:1 for the high speed gear ratio and 6:1 to 20:1 for the low speed gear ratio. In practical applications, high speed gear ratios of about 2:1 to 4:1 and low speed gear ratios of 6:1 to 20:1 are possible considering normal constraints of gear tooth loads and space limitations that are well known in the art.

The clutch 28 and/or the clutch 48 may be engaged automatically or manually. Preferably, the low speed gear ratio and the high speed gear ratio are activated automatically, and the neutral mode and the park mode are activated manually. Automatic shifting of the two speed gear box 10 into high speed or low speed gear ratios may require information on speed and torque status of the drive. An electronic controller may receive input data on engine throttle, vehicle speed, engine speed, vehicle load, wheel traction, terrain topography, the torque and speed status of the other wheels, and perhaps various other parameters to determine shifting the two speed gear box 10 from high speed to low speed and vice versa when required. The electronic controller then transmits shifting commands to actuators to engage or disengage the clutch 28 and/or the clutch 48 to shift the two speed gear box 10 into the desired gear ratio. The clutch 28 and the clutch 48 may be actuated by methods well known in the art, such as but not limited to, hydraulic or electro-mechanical actuation.

The disclosed two speed two speed gear box 10 provides a cost effective way to extend the torque and speed range of mechanical, hydrostatic and electric drives. In particular, the two speed gear box 10 is well suited to hydrostatic and electric drives because such drives can change the direction of rotation of the wheels without requiring a reverse shifting mechanism. The applications in which the disclosed wheel hub gearbox 10 can be used range from small appliances to large industrial vehicles. The potential applications of the disclosed multi-speed gear box 10 include, by way of example rather than limitation, domestic appliances such as sink mounted garbage disposal units, food blenders, and power tools; industrial applications such as winches, hoists, and material handling equipment; and, vehicle applications such a golf buggies, agricultural tractors, earthmoving equipment, forklifts, and personnel carriers.

Figure 4:
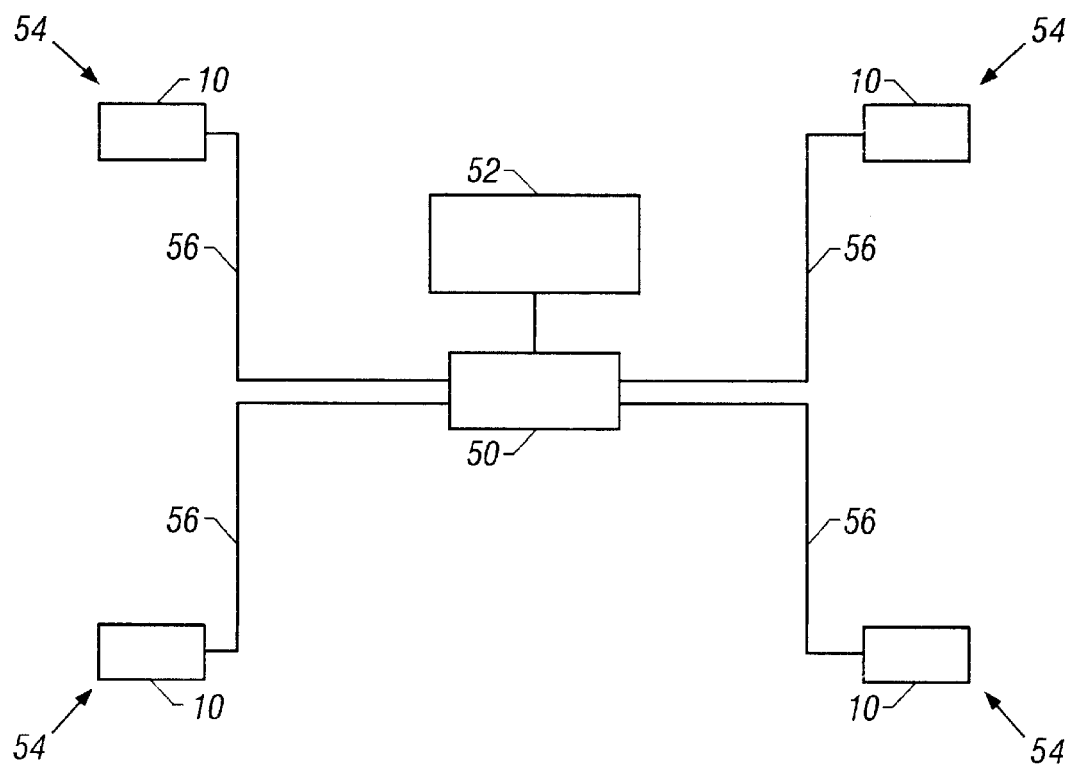
FIG. 4 is an exemplary diagram of a hydrostatic drive system using the two speed gear box of the present invention.

Application of the disclosed two speed gear box 10 to hydrostatic drive systems may offer certain operational advantages due to the fact that many such drive systems have a limited torque and speed range. Referring to FIG. 4, a hydrostatic drive system typically includes a hydrostatic pump 50 that is powered by a vehicle engine 52. The hydrostatic pump 50 transmits power to the drive wheels 54 through hydrostatic drive lines 56. Hydrostatic drive systems are typically favored in some industrial applications and heavy equipment because such drive systems may offer several attractive and important operating features when used in such applications. Some of the advantages of hydrostatic drive systems may include, for example, the ability to provide a wide range of speed/torque variation over their operating range, while the prime mover or engine runs at its most efficient constant speed. Further, such drive systems may operate in reverse at a controlled speed and remain unaffected by output loads, may provide dynamic braking capabilities, and may respond more rapidly than mechanical or electrical transmissions with comparable power ratings. Further, such systems permit power transmission from a single prime mover to multiple locations, even if the positions and orientation of these locations change. However, hydrostatic drive systems have a limited speed/torque range compared to multi-ratio mechanical transmissions. The practical limit of the speed/torque range for hydrostatic drive systems is 9:1, where vehicle applications typically require a speed/torque range of 15:1.

As an example, one industrial vehicle that may benefit from above noted advantages of hydrostatic drive systems is a tractor scraper. To cut and load the soil a tractor scraper must provide high traction forces to the ground at low speed. To be effective as a haulage vehicle a tractor scraper must have a comparatively high road speed capability. Also, because of typically poor ground conditions in a tractor scraper's work environment, all wheels must be driven during the loading cycle. The torque and speed range required for a tractor scraper is of the order of mechanical drives in tractor scrapers, however, has a significant drawback. The arrangement of a tractor scraper, with the bowl for the soil payload between the drive axles does not allow mechanical drive lines between the two drive axles, and all wheel drive is provided by two engines and two mechanical transmissions driving each of the two axles. As shown in FIG. 4, the two speed wheel hub gearbox 10, applied to all four wheels of a two axle tractor scraper, allows the use of a hydrostatic drive system, providing an extended speed/torque range to the hydrostatic drive system. Further all drive wheels 54 can be driven from a single engine 52 in a location not constrained by the limitation of mechanical drive lines.

A feature of such a four wheel drive application is that the wheel hub gearbox 10 provides a mechanism for traction control, which is applicable to any type of vehicle including passenger automobiles. If one wheel loses traction and spins, that wheel can be placed in freewheel mode and the power applied to the other wheels that still have traction. Another feature is that during high steering angle turns power turning capability can be provided by use of the freewheel mode on the inside rear wheel.

Those skilled in the art will appreciate that, although the teachings of the invention have been illustrated in connection with certain embodiments, there is no intent to limit the invention to such embodiments. On the contrary, the intention of this application is to cover all modifications and embodiments fairly falling within the scope of the appended claims either literally or under the doctrine of equivalents.

What is claimed is:

1. A two speed gear box for driving a hub, the gear box comprising:

said hub;
   a spindle, the spindle adapted to rotatably support the hub;
   an inboard planetary gear assembly comprising:
      a sun gear driven by a drive axle;
      a plurality of planetary gears;
      a ring gear;
      a planetary gear carrier, the planetary gear carrier interconnecting the planetary gears; and
      an inboard clutch adapted to couple the sun gear of the inboard planetary gear assembly to the planetary gear carrier of the inboard planetary gear assembly;
   an outboard planetary gear assembly comprising:
      a sun gear;
      a plurality of planetary gears;
      a ring gear coupled to the wheel hub;
      a planetary gear carrier interconnecting the planetary gears and joined to the spindle; and
      an outboard clutch adapted to couple the ring gear of the inboard planetary gear assembly with the planetary gear carrier of the outboard planetary gear assembly.

2. The gear box of claim 1, including means for selectively engaging each of the inboard clutch and the outboard clutch, and wherein the inboard planetary gear assembly and the outboard planetary gear assembly cooperate to define a plurality of operating modes, and wherein the operating modes comprise:

a brake mode defined by engaging the inboard clutch and engaging the outboard clutch;
   a neutral mode defined by disengaging the inboard clutch and disengaging the outboard clutch mode;
   a first speed mode defined by engaging the inboard clutch and disengaging the outboard clutch; and
   a second speed mode defined by disengaging the inboard clutch and engaging the outboard clutch.

3. The gear box of claim 1, wherein at least one of the inboard clutch and the outboard clutch is adapted to be engaged and disengaged automatically.

4. The gear box of claim 1, wherein the drive axle is driven by a hydrostatic drive system.

5. The gear box of claim 1, wherein the plurality of planetary gears of the inboard planetary gear assembly operatively connected to the sun gear of the outboard planetary gear assembly, such that the sun gear rotates about a drive axis in conjunction with the gear carrier of the inboard planetary gear assembly.

6. The gear box of claim 1, wherein the ring gear of the outboard planetary gear assembly forms a portion of the hub.

7. The gear box of claim 1, wherein the sun gear of the outboard planetary gear assembly is affixed to the planetary gear carrier of the inboard planetary gear assembly such that the planetary gear carrier of the inboard planetary gear assembly and the sun gear of the outboard planetary gear assembly rotate in conjunction about a drive axis.

8. The gear box of claim 1, wherein the planetary gear carrier of the outboard planetary gear assembly is joined to the spindle.

9. The gear box of claim 1, wherein the spindle houses the inboard planetary gear assembly and the outboard clutch.

10. The gear box of claim 1, wherein the spindle includes a generally cylindrical interior surface, a portion of the interior surface defining the ring gear of the inboard planetary gear assembly.

11. A wheel hub assembly comprising:

a wheel hub;
   a spindle adapted to rotatably support the wheel hub;
   an inboard planetary gear assembly comprising:
      a sun gear adapted for connection to a drive axle;
      a plurality of planetary gears disposed around the sun gear;
      a ring gear engaging the planetary gears;
      a planetary gear carrier interconnecting the planetary gears; and
      an inboard clutch adapted to couple the sun gear of the inboard planetary gear assembly to the planetary gear carrier of the inboard planetary gear assembly;
   an outboard planetary gear assembly comprising:
      a sun gear adapted for connection to the planetary gear carrier of the inboard planetary gear assembly;
      a plurality of planetary gears disposed around the sun gear;
      a ring gear joined to the wheel hub and engaging the planetary gears;
      a planetary gear carrier interconnecting the plurality of planetary gears and joined to the spindle; and
      an outboard clutch adapted to couple the ring gear of the inboard planetary assembly to the planetary gear carrier of the outboard planetary gear assembly;
   wherein, selectively engaging and disengaging each of the inboard clutch and outboard clutch provides a plurality of operating modes, the operating modes comprising:
      a brake mode defined by engaging the inboard clutch engaging the outboard clutch;
      a neutral mode defined by disengaging the inboard clutch and disengaging the outboard clutch mode;
      a first speed mode defined by engaging the inboard clutch and disengaging the outboard clutch; and
      a second speed mode defined by disengaging the inboard clutch and engaging the outboard clutch.

12. The wheel hub assembly of claim 11, wherein the spindle houses the inboard planetary gear assembly and the outboard clutch.

13. The wheel hub assembly of claim 11, wherein at least one of the inboard clutch and the outboard clutch is adapted to be engaged and disengaged automatically.

14. The wheel hub assembly of claim 11, wherein the drive axle is driven by a hydrostatic drive system.

15. A hub assembly for use with a torque source comprising:

an axle operatively connected to the torque source;

a spindle:

a hub;

first coupling means comprising:
- a first mode;
- a second mode: and
- means for shifting from the first mode to the second mode;

second coupling means for coupling the first coupling means to the hub, the second coupling means comprising:
- a first mode;
- a second mode; and
- means for shifting from the first mode to the second mode;

wherein the first mode and the second mode of the first coupling means and the first mode and the second mode of the second coupling means cooperate to provide a plurality of geared outputs for the hub relative to the torque input; and wherein the plurality of geared outputs for the hub comprise:

- a brake mode defined by the first means for gearing operating at the first mode of the first means for gearing and the means for coupling operating at the first mode of the means for coupling;
- a neutral mode defined by the first means for gearing operating at the second mode of the first means for gearing and the means for coupling operating at the first mode of the means for coupling;
- a high speed mode defined by first means for gearing operating at the first mode of the first means for gearing and the means for coupling operating at the second mode of the means for coupling; and
- a low speed mode defined by first means for gearing operating at the second mode of the first means for gearing and the means for coupling operating at the first mode of the means for coupling.

16. The hub assembly of claim 15, further comprising means for automatically shifting at least one of the first coupling means and the second coupling means.

\* \* \* \* \*